United States Patent
Pline

(10) Patent No.: US 10,328,888 B2
(45) Date of Patent: Jun. 25, 2019

(54) LAP-BELT LENGTH DETECTING SEATBELT ASSEMBLY

(71) Applicant: Ford Global Technologies, LLC, Dearborn, MI (US)

(72) Inventor: Kevin Michael Pline, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 259 days.

(21) Appl. No.: 15/380,360

(22) Filed: Dec. 15, 2016

(65) Prior Publication Data

US 2018/0170296 A1 Jun. 21, 2018

(51) Int. Cl.
| | |
|---|---|
| *B60R 21/015* | (2006.01) |
| *B60R 21/23* | (2006.01) |
| *B60R 22/48* | (2006.01) |
| *B60R 21/01* | (2006.01) |

(52) U.S. Cl.
CPC ........ *B60R 21/23* (2013.01); *B60R 21/01544* (2014.10); *B60R 22/48* (2013.01); *B60R 2021/01211* (2013.01); *B60R 2021/01279* (2013.01); *B60R 2022/485* (2013.01); *B60R 2022/4825* (2013.01)

(58) Field of Classification Search
CPC ...... B60R 21/01544; B60R 2022/4825; B60R 2022/485
See application file for complete search history.

(56) References Cited

U.S. PATENT DOCUMENTS

| 6,581,960 B1* | 6/2003 | Schondorf | B60R 21/01546 180/273 |
|---|---|---|---|
| 9,156,433 B2 | 10/2015 | Nagasawa, Sr. | |
| 2010/0114436 A1* | 5/2010 | Bernhagen | B60R 22/48 701/45 |
| 2015/0251618 A1* | 9/2015 | Ghannam | B60R 22/48 340/457.1 |
| 2015/0265200 A1* | 9/2015 | Mahdi | A61B 5/0205 600/301 |
| 2015/0360643 A1 | 12/2015 | Cech et al. | |

(Continued)

FOREIGN PATENT DOCUMENTS

| DE | 10136267 A1 | 2/2002 |
|---|---|---|
| DE | 102005002866 A1 | 7/2006 |

(Continued)

OTHER PUBLICATIONS

Yamada et al., Seat Belt Device Provided With Webbing Pull-Out Quantity Detecting Device, Aug. 2, 2000, JPO, JP 2000-211476 A, English Abstract (Year: 2000).*

(Continued)

*Primary Examiner* — James A English
(74) *Attorney, Agent, or Firm* — Frank A. MacKenzie; Bejin Bieneman PLC

(57) ABSTRACT

A seatbelt assembly includes webbing elongated along a length, a clip slidable along the length of the webbing, an indicator extending along the length of the webbing, and a sensor coupled to the clip and sensitive to the indicator. The seatbelt assembly measures a length of a lap band stretched across an occupant. Safety features may be tailored to the body type of the occupant.

20 Claims, 4 Drawing Sheets

(56) References Cited

U.S. PATENT DOCUMENTS

| | | | | |
|---|---|---|---|---|
| 2016/0251618 A1* | 9/2016 | Gamm | ................. | C12N 5/0621 |
| | | | | 435/368 |
| 2017/0088096 A1* | 3/2017 | Luebbers | .......... | B60R 21/01544 |
| 2017/0291575 A1* | 10/2017 | Le | ........................... | B60R 22/48 |
| 2017/0291576 A1* | 10/2017 | Le | ..................... | B60R 21/01548 |
| 2018/0208318 A1* | 7/2018 | Brunaux | ................. | B60R 22/48 |

FOREIGN PATENT DOCUMENTS

| | | |
|---|---|---|
| DE | 102007041535 A1 | 3/2009 |
| DE | 102010014366 A1 | 11/2010 |
| FR | 2935939 A1 | 3/2010 |
| JP | 2000211476 A * | 8/2000 |
| WO | WO 9924291 | 5/1999 |

OTHER PUBLICATIONS

Yamada et al., Seat Belt Device Provided With Webbing Pull-Out Quantity Detecting Device, Aug. 2, 2000, JPO, JP 2000-211476 A, Machine Translation of Description (Year: 2000).*
GB Search Report dated Jun. 6, 2018 re: GB Appl. No. 1720606.1.

* cited by examiner

LAP-BELT LENGTH DETECTING SEATBELT ASSEMBLY

BACKGROUND

Vehicles, such as automobiles, may include seatbelts for occupants. One arrangement of the seatbelt is a three-point harness: webbing of the seatbelt is anchored around the occupant at three points. Specifically, the webbing may be connected at a mounting point below and to one side of a hip of the occupant, may be connected above and to the same side of a shoulder of the occupant, and may fasten to the opposite side of the hip of the occupant. The webbing is divided into a shoulder band crossing from one shoulder of the occupant to the opposite side of the hip and a lap band crossing from one side of the hip to the other.

DETAILED DESCRIPTION

Figure 1:
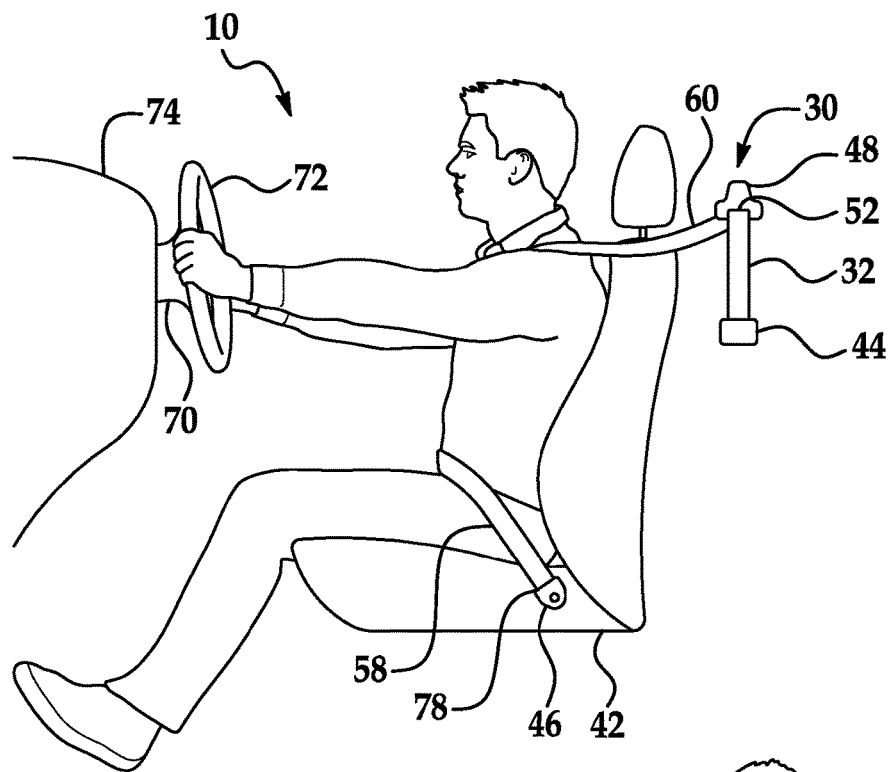
FIG. 1 is a side view of a portion of a passenger cabin of a vehicle.

With reference to the Figures, wherein like numerals indicate like parts throughout the several views, a seatbelt assembly 30 in a vehicle 10 includes webbing 32 elongated along a length L, a clip 34 slidable along the length L of the webbing 32, an indicator 38 extending along the length L of the webbing 32, and a sensor 40 coupled to the clip 34 and sensitive to the indicator 38.

The seatbelt assembly 30 measures a length l of a lap band 58 stretched across an occupant. The length l of the lap band 58 is correlated with a body type of the occupant, for example, whether the occupant is thin or heavy set. With information on body type, safety features of the vehicle 10 may be tailored to the body type of the occupant, which may make the safety features more effective.

Figure 2:
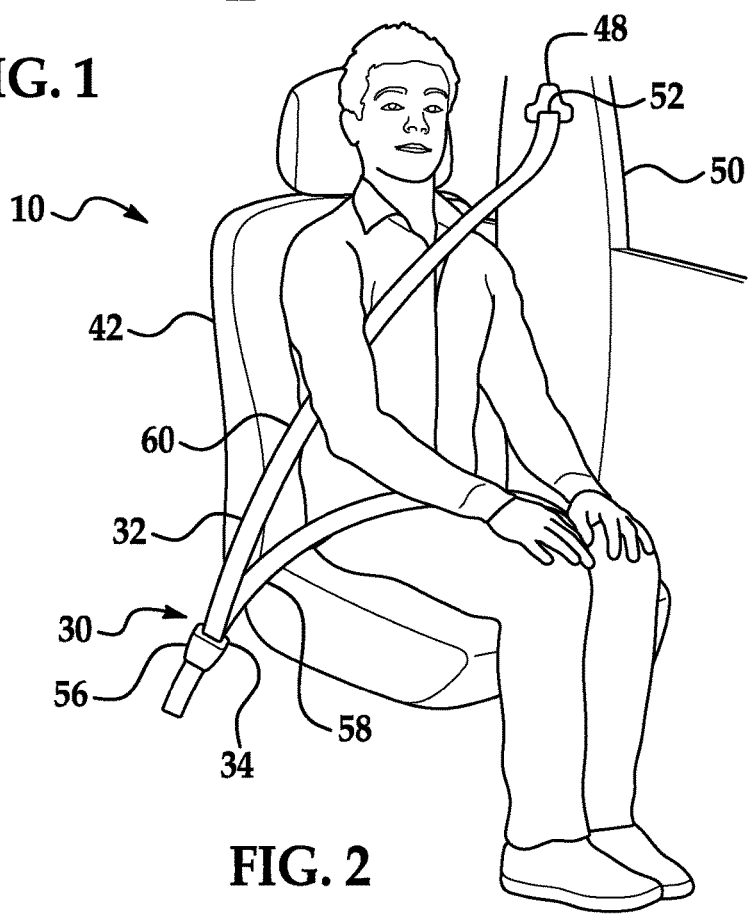
FIG. 2 is a perspective view of a portion of the passenger cabin.

With reference to FIGS. 1 and 2, the vehicle 10 includes a seat 42 that may support the occupant. The seat 42 may be a front seat or a rear seat, and may be in any cross-vehicle position. The seat 42 shown in FIGS. 1 and 2 is a bucket seat, but alternatively the seat 42 may be a bench seat or another type of seat.

The webbing 32 may extend between a retractor 44 and an anchor 46. Between the retractor 44 and the anchor 46, the webbing 32 may extend through a webbing guide 48 and the clip 34. The webbing 32 may be formed of a fabric, e.g., woven nylon.

Figure 4:
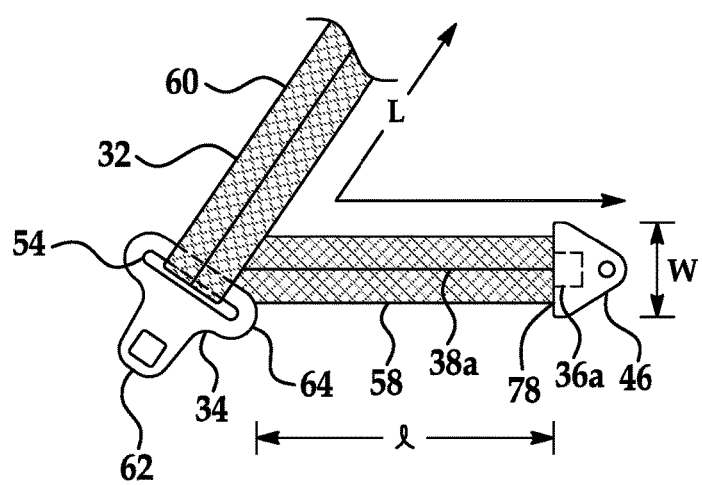
FIG. 4 is a front view of a first embodiment of a seatbelt assembly.
Figure 6:
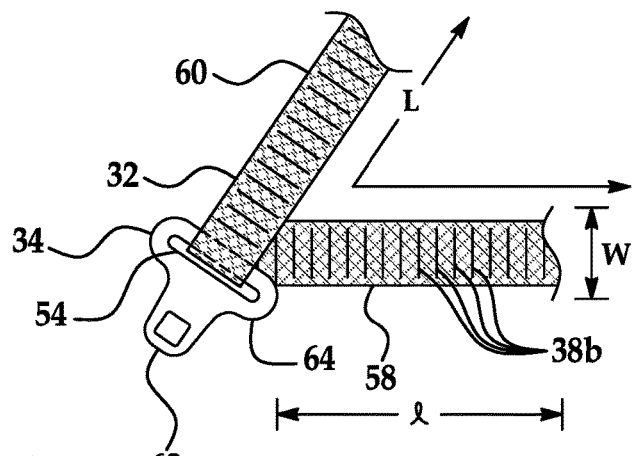
FIG. 6 is a front view of a second embodiment of the seatbelt assembly.
Figure 8:
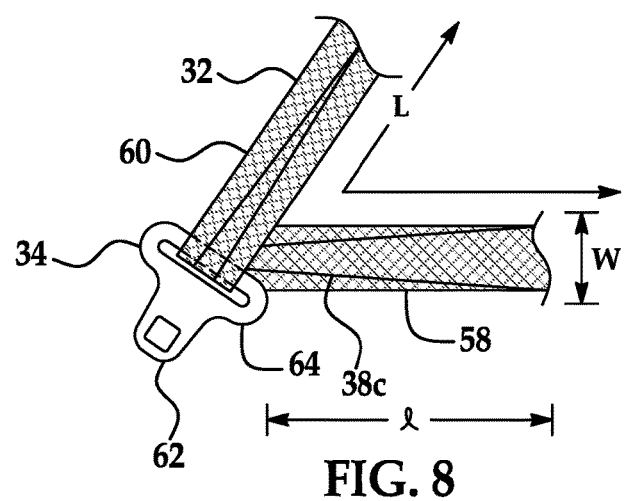
FIG. 8 is a front view of a third embodiment of the seatbelt assembly.

The webbing 32 has the length L, a width W, and a thickness T. The webbing 32 is elongated along the length L. The length L extends in a direction of a longest dimension of the webbing 32. The length L may change direction about the clip 34, as shown in FIGS. 4, 6, and 8, and/or about an occupant. The width W extends transverse to the length L. The width W is shorter than the length L and longer than the thickness T. The thickness T is shorter than the width W.

The seatbelt assembly 30 may include the retractor 44. The webbing 32 is retractably payable from the retractor 44, i.e., may be extended from and retracted into the retractor 44. The retractor 44 may be attached to a body (not numbered) of the vehicle 10, e.g., to a B pillar 50 in the instance the seat 42 is a front seat, to a C pillar (not numbered) when the seat 42 is a rear seat, etc. The retractor 44 may alternatively be mounted to the seat 42. The retractor 44 may release the webbing 32 to allow an occupant to position the webbing 32 around the occupant and retract the webbing 32 to take up slack.

The webbing guide 48 may be fixed to the B pillar 50 or another location above the retractor 44. The webbing guide 48 may allow the webbing 32 to slide freely through the webbing guide 48, specifically through a webbing-guide slot 52. The webbing-guide slot 52 may be sized to accommodate the width W and thickness T of the webbing 32.

The seatbelt assembly 30 may include the anchor 46 that attaches one end 78 of the webbing 32 to the seat 42 or to the body of the vehicle 10. The anchor 46 may be, e.g., a metal plate sandwiching the end 78 of the webbing 32 and bolted to the seat 42.

The clip 34 is slidable along the length L of the webbing 32. The clip 34 includes a slot 54 receiving the webbing 32. The slot 54 may be sized to accommodate the width W and thickness T of the webbing 32. The clip 34 may slidably engage the webbing 32 so that the clip 34 may be moved to a desired position along the webbing 32. The clip 34 slides freely along the webbing 32 and, when engaged with a buckle 56, divides the webbing 32 into the lap band 58 and a shoulder band 60. The lap band 58 extends from the anchor 46 to the clip 34, and the shoulder band 60 extends from the clip 34 to the webbing guide 48. The clip 34 may include a tongue 62 extending from a clip body 64.

The seatbelt assembly 30 may include the buckle 56 fixed to the seat 42 that releasably engages the clip 34, specifically the tongue 62 of the clip 34. Inserting the tongue 62 in the buckle 56 may engage the buckle 56, and pushing a button may cause the buckle 56 to release the tongue 62.

The seatbelt assembly 30 is a three-point harness, meaning that the webbing 32 is attached at three points around the occupant when fastened: the anchor 46, the webbing guide 48, and the buckle 56. The seatbelt assembly 30 may, alternatively, include another arrangement of attachment points. When the clip 34 is engaged with the buckle 56 and the webbing 32 extends across the occupant, the seatbelt assembly 30 retains the occupant on the seat 42, for example, during sudden decelerations of the vehicle 10. Specifically, the retractor 44 locks the webbing 32 to prevent payout of the webbing 32 during a sudden deceleration of the vehicle 10. The retractor 44 may have a load limit, that is, a maximum force in a direction of payout of webbing 32 beyond which the retractor 44 allows payout even after locking.

Figure 3:
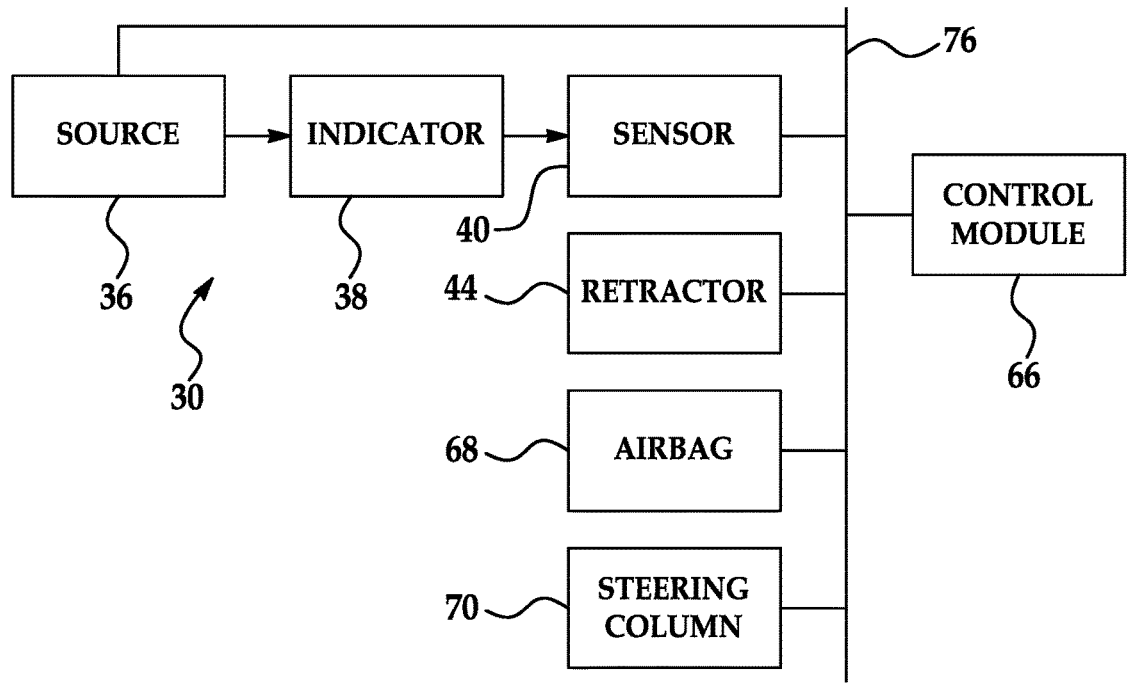
FIG. 3 is a block diagram of a control system.

With reference to FIG. 3, the seatbelt assembly 30 includes a source. The source produces an output that is transferable through the indicator 38 and is detectable by the sensor 40. As described below, according to the different embodiments described below, the source may be a voltage source 36a, 36b, a light source 36c, 36d, etc.

The indicator 38 extends along the length L of the webbing 32 and has a characteristic varying along the length L of the webbing 32. The characteristic may be a reaction to output from the source. For example, according to the different embodiments described below, the characteristic of the indicator 38 may be a resistance, transparency, etc.

The sensor 40 is sensitive to the indicator 38. Specifically, the sensor 40 may be sensitive to the characteristic of the indicator 38. For example, according to the different embodiments described below, the sensor 40 may be an electrical sensor 40a, 40b, a light sensor 40c, 40d, etc. The sensor 40 may be coupled to the clip 34. Alternatively, the sensor 40 may be coupled to the anchor 46.

The seatbelt assembly 30 may include a control module 66. The control module 66 is a microprocessor-based controller. The control module 66 may include a processor, memory, etc. The memory of the control module 66 may include memory for storing instructions executable by the processor as well as for electronically storing data and/or databases. The control module 66 may be, e.g., a restraint control module. The control module 66 may be in communication with and may control an airbag 68, the retractor 44, a steering column 70, and other components of a restraint system, among other functions.

The seatbelt assembly 30 may transmit signals through a communications network 76 such as a controller area network (CAN) bus, Ethernet, Local Interconnect Network (LIN), and/or by any other wired or wireless communications network. The control module 66 may be in communication with the source, the sensor 40, the retractor 44, the airbag 68, and the steering column 70 through the communications network 76. The sensor 40 may be connected to the communications network 76 via, e.g., an electrical connection through the clip 34 and the buckle 56 or a wireless communication such as Bluetooth or infrared.

The airbag 68 may be disposed in a steering wheel 72, an instrument panel 74, an upper rail, etc. (not shown). The airbag 68 may be inflatable in response to a signal from the control module 66, for example, via an inflator (not shown). The airbag 68, when inflating, may have an inflation stiffness, in other words, how full of inflation medium the airbag 68 is.

The airbag 68 may be formed of any suitable airbag material, for example, a woven polymer. For example, the airbag 68 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 1 and 3, the steering column 70 may connect the steering wheel 72 to the instrument panel 74. In an embodiment in which the seat 42 is a driver seat, the steering column 70 may be disposed in a vehicle-forward direction from the seat 42. The steering column 70 may have an adjustable stroke absorption, which is a measure of energy absorption during a collapse of the steering column 70, in other words, how easily the steering column 70 collapses when impacted.

The control module 66 may be programmed to receive a signal from the sensor 40 through the communications network 76 indicating a position of the clip 34 along the webbing 32 and to adjust one or more of the inflation stiffness of the airbag 68, the load limit of the retractor 44, and the stroke absorption of the steering column 70 based on the position of the clip 34. The position of the clip 34 defines the length l of the lap belt portion of the webbing 32.

In operation, an occupant enters the vehicle 10 and buckles the clip 34 into the buckle 56. In doing so, the occupant positions the clip 34 along the webbing 32 and divides the webbing 32 into the lap band 58 and the shoulder band 60. The control module 66 instructs the source to provide output. The sensor 40 detects the output of the source through the indicator 38 according to the characteristic of the indicator 38. The sensor 40 transmits a signal to the control module 66 that indicates the position of the clip 34 along the webbing 32, that is, the length l of the lap band 58. If the occupant is thinner, the length l of the lap band 58 will be shorter, and if the occupant is heavier set, the length l of the lap band 58 will be longer. The control module 66 may transmit a signal to the airbag 68 specifying the inflation stiffness of the airbag 68 based on the length l of the lap band 58 so that, in the event of a collision and a deployment of the airbag 68, the inflation stiffness of the airbag 68 may be optimized to a size of the occupant. The control module 66 may transmit a signal to the retractor 44 specifying the load limit so that, in the event of a collision and a locking of payout of the webbing 32 from the retractor 44, the load limit of the retractor 44 may be optimized to the size of the occupant. The control module 66 may transmit a signal to the steering column 70 specifying the stroke absorption so that, in the event of a collision, the stroke absorption of the steering column 70 may be optimized to the size of the occupant. Alternatively, the control module 66 may transmit the signals to one or more the airbag 68, the retractor 44, and/or the steering column 70 after receiving a signal indicating a collision to the vehicle 10.

Figure 5:
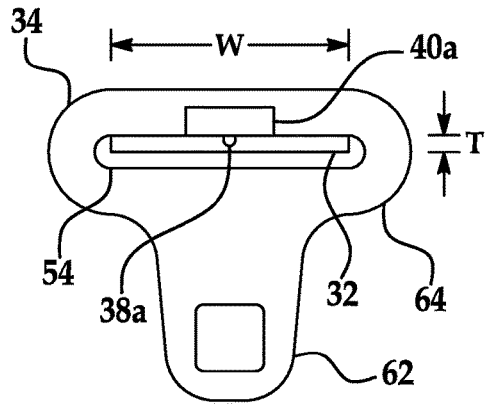
FIG. 5 is a front view of a clip and webbing of the first embodiment of the seatbelt assembly.

With reference to FIGS. 4 and 5, the first embodiment of the seatbelt assembly 30 may include the voltage source 36a, a conductive wire 38a for the indicator 38, and the electrical sensor 40a.

The voltage source 36a is coupled to one of the clip 34 and the end 78 of the webbing 32. The voltage source 36a is electrically connected to the conductive wire 38a via one of the clip 34 and the end 78 of the webbing 32, such as at the anchor 46. As shown in FIG. 4, the voltage source 36a is disposed at the anchor 46. The voltage source 36a may provide a potential difference causing an electrical current to flow through the wire 38a to the electrical sensor 40a. The voltage source 36a may be, e.g., a battery, a capacitor, an electrical connection to a battery or a capacitor located elsewhere in the vehicle 10, etc.

With continued reference to FIGS. 4 and 5, the wire 38a extends along the length L of the webbing 32. The characteristic is an electrical resistance. For example, the resistance of the wire 38a may be $R=\rho*l/A$, in which R is the resistance of the wire 38a between the voltage source 36a and the electrical sensor 40a; $\rho$ is a resistivity of a material forming the wire 38a; l is the distance along the webbing 32 from the voltage source 36a to the electrical sensor 40a, that is, the length l of the lap band 58; and A is a cross-sectional area of the wire 38a. The wire 38a may be formed of a conductive material such as copper. The material may be chosen to have a relatively high resistivity so that a measurable difference in resistance occurs at different lengths l of the lap band 58 while still being conductive.

With continued reference to FIGS. 4 and 5, the electrical sensor 40a may be coupled to the other of the clip 34 and the end 78 of the webbing 32 than the voltage source 36a. As shown in FIG. 4, the electrical sensor 40a is coupled at the clip 34. The voltage source 36a, the wire 38a, and the electrical sensor 40a form an electrical path. The electrical sensor 40a is sensitive to an electrical resistance of the wire 38a from the clip 34 to the end 78. The electrical sensor 40a may be, e.g., an ohmmeter, a voltage detector, a current sensor, or any other sensor sensitive to electrical current.

Figure 7:
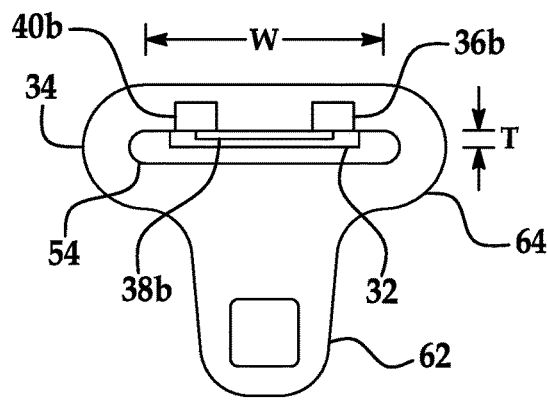
FIG. 7 is a front view of the clip and webbing of the second embodiment of the seatbelt assembly.

With reference to FIGS. 6 and 7, the second embodiment of the seatbelt assembly 30 may include the voltage source 36b, a plurality of electrically conductive segments 38b for the indicator 38, and the electrical sensor 40b.

With continued reference to FIGS. 6 and 7, the voltage source 36b is coupled to the clip 34 and electrically connected to the segments 38b via the clip 34. The voltage source 36b may provide a potential difference causing an electrical current to flow through one or more of the segments 38b to the electrical sensor 40b. The voltage source 36b may be, e.g., a battery, a capacitor, an electrical connection to a battery or a capacitor located elsewhere in the vehicle 10, etc.

With continued reference to FIGS. 6 and 7, the indicator 38 is the plurality of electrically conductive segments 38b. The segments 38b are spaced from each other along the length L. The segments 38b may each have different electrical resistance. As one example, the segments 38b may be arranged in ascending order of electrical resistance along the length L of the webbing 32. The segments 38b are elongated along the width W of the webbing 32. The segments 38b are electrically isolated from each other along the length L of the webbing 32. The segments 38b may be spaced so that at least one segment 38b is disposed in the slot 54 of the clip 34.

With continued reference to FIGS. 6 and 7, the electrical sensor 40b may be coupled to the clip 34. The voltage source 36b, at least one of the segments 38b, and the electrical sensor 40b form an electrical path. The electrical sensor 40b may be disposed at an end of the slot 54 of the clip 34 opposite the voltage source 36b. The electrical sensor 40b is sensitive to an electrical resistance of the segment 38b across the width W of the webbing 32. The electrical sensor 40b may be, e.g., an ohmmeter, a voltage detector, a current sensor, or any other sensor sensitive to electrical current.

Figure 9:
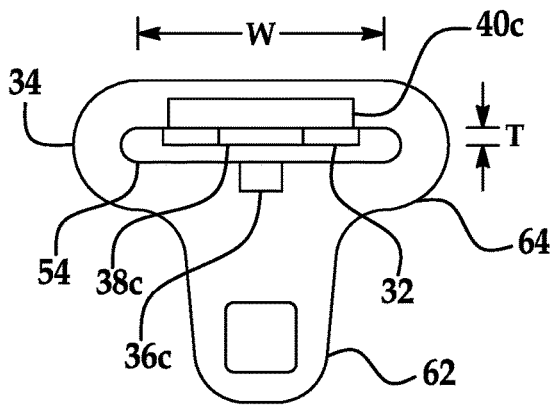
FIG. 9 is a front view of the clip and webbing of the third embodiment of the seatbelt assembly.

With reference to FIGS. 8 and 9, the third embodiment of the seatbelt assembly 30 may include the light source 36c, a window 38c for the indicator 38, and the light sensor 40c.

The light source 36c may be coupled to the clip 34. Specifically, the light source 36c may face the slot 54 of the clip 34. The light source 36c may produce visible light, infrared light, or another spectrum of light detectable by the light sensor 40c.

The indicator 38 is the window 38c through the webbing 32. The window 38c has a transparency greater than the webbing 32 and a width that narrows along the length L of the webbing 32. The characteristic is a transparency of the window 38c. Specifically, a ratio of the width of the window 38c to the width W of the webbing 32 decreases along the length L of the webbing 32, meaning less light is allowed to pass through the window 38c along the length L of the webbing 32 as the width of the window 38c narrows.

The light sensor 40c may be coupled to the clip 34. Specifically, the light sensor 40c may be disposed across the slot 54 from the light sensor 40c. The light source 36c and the light sensor 40c may face each other along the thickness T of the webbing 32, and the webbing 32 may be disposed between the light source 36c and the light sensor 40c.

Figure 10:
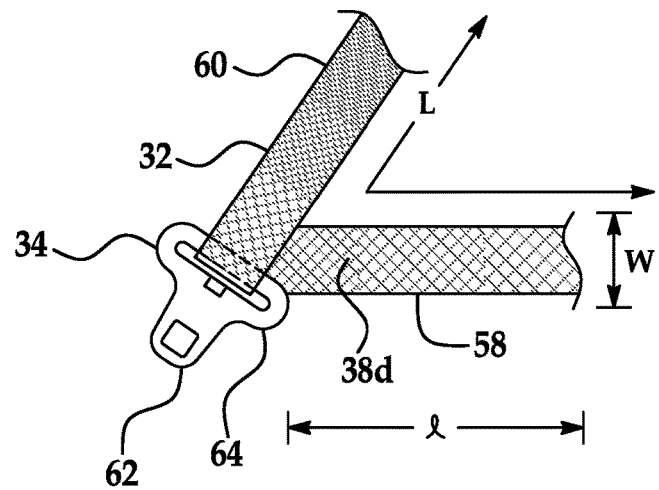
FIG. 10 is a front view of a fourth embodiment of the seatbelt assembly.
Figure 11:
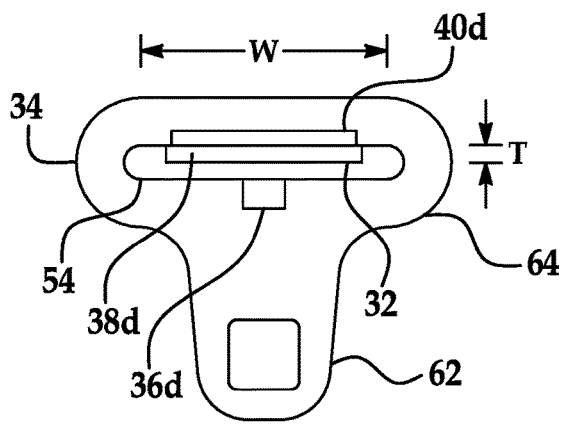
FIG. 11 is a front view of the clip and webbing of the fourth embodiment of the seatbelt assembly.

With reference to FIGS. 10 and 11, the fourth embodiment of the seatbelt assembly 30 may include the light source 36d, a transparency coating 38d for the indicator 38, and the light sensor 40d.

The light source 36d may be coupled to the clip 34. Specifically, the light source 36d may face the slot 54 of the clip 34. The light source 36d may produce visible light, infrared light, or another spectrum of light detectable by the light sensor 40d.

The indicator 38 is the coating 38d affecting a transparency of the webbing 32. The coating 38d may decrease in density and/or thickness along the length L, making the webbing 32 more transparent along the length L. The change in density of the coating 38d along the length L may be continuous, or may be in discrete increments. In the fourth embodiment, the characteristic is a transparency of the webbing 32.

The light sensor 40d may be coupled to the clip 34. Specifically, the light sensor 40d may be disposed across the slot 54 from the light sensor 40d. The light source 36d and the light sensor 40d may face each other along the thickness T of the webbing 32, and the webbing 32 may be disposed between the light source 36d and the light sensor 40d.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt assembly comprising:
   webbing elongated along a length;
   a clip slidable along the length of the webbing and that divides the webbing into a lap band and a shoulder band;
   an indicator extending along the length of the webbing; and
   a sensor coupled to the clip and sensitive to the indicator.

2. The seatbelt assembly of claim 1, wherein the indicator has a characteristic varying along the length of the webbing.

3. The seatbelt assembly of claim 2, wherein the characteristic is an electrical resistance.

4. The seatbelt assembly of claim 2, wherein the characteristic is a transparency of the indicator.

5. The seatbelt assembly of claim 1, wherein the sensor is an electrical sensor.

6. The seatbelt assembly of claim 5, wherein the indicator is a conductive wire.

7. The seatbelt assembly of claim 6, further comprising a voltage source electrically connected to the wire via one of the clip and an end of the webbing.

8. The seatbelt assembly of claim 5, wherein the indicator is a plurality of electrically conductive segments electrically isolated from each other along the length of the webbing.

9. The seatbelt assembly of claim 8, wherein the segments are arranged in ascending order of electrical resistance along the length of the webbing.

10. The seatbelt assembly of claim 9, further comprising a voltage source coupled to the clip.

11. The seatbelt assembly of claim 10, wherein the voltage source, one of the segments, and the sensor form an electrical path.

12. The seatbelt assembly of claim 1, wherein the sensor is a light sensor.

13. The seatbelt assembly of claim 12, further comprising a light source coupled to the clip.

14. The seatbelt assembly of claim 13, wherein the clip includes a slot receiving the webbing, and the light source is disposed across the slot from the light sensor.

15. The seatbelt assembly of claim 12, wherein the indicator is a coating affecting a transparency of the webbing.

16. The seatbelt assembly of claim 12, wherein the indicator is a window through the webbing having a transparency greater than the webbing and a width that narrows along the length of the webbing.

17. The seatbelt assembly of claim 1, further comprising a control module in communication with the sensor, the control module programmed to receive a signal from the sensor indicating a position of the clip along the webbing, and adjust one of an inflation stiffness of an airbag, a load limit of a seatbelt retractor, and a stroke absorption of a steering column based on the position of the clip.

18. A seatbelt assembly comprising:
 webbing elongated along a length;
 a clip slidable along the length of the webbing and that divides the webbing into a lap band and a shoulder band;
 a wire extending along the length of the webbing;
 a voltage source electrically connected to the wire via the clip; and
 an electrical sensor coupled to an end of the webbing.

19. The seatbelt assembly of claim 18, wherein the electrical sensor is sensitive to an electrical resistance of the wire from the clip to the end.

20. The seatbelt assembly of claim 18, further comprising a control module in communication with the electrical sensor, the control module programmed to receive a signal from the electrical sensor indicating a position of the clip along the webbing, and adjust one of an inflation stiffness of an airbag, a load limit of a seatbelt retractor, and a stroke absorption of a steering column based on the position of the clip.

* * * * *